Patented June 9, 1931

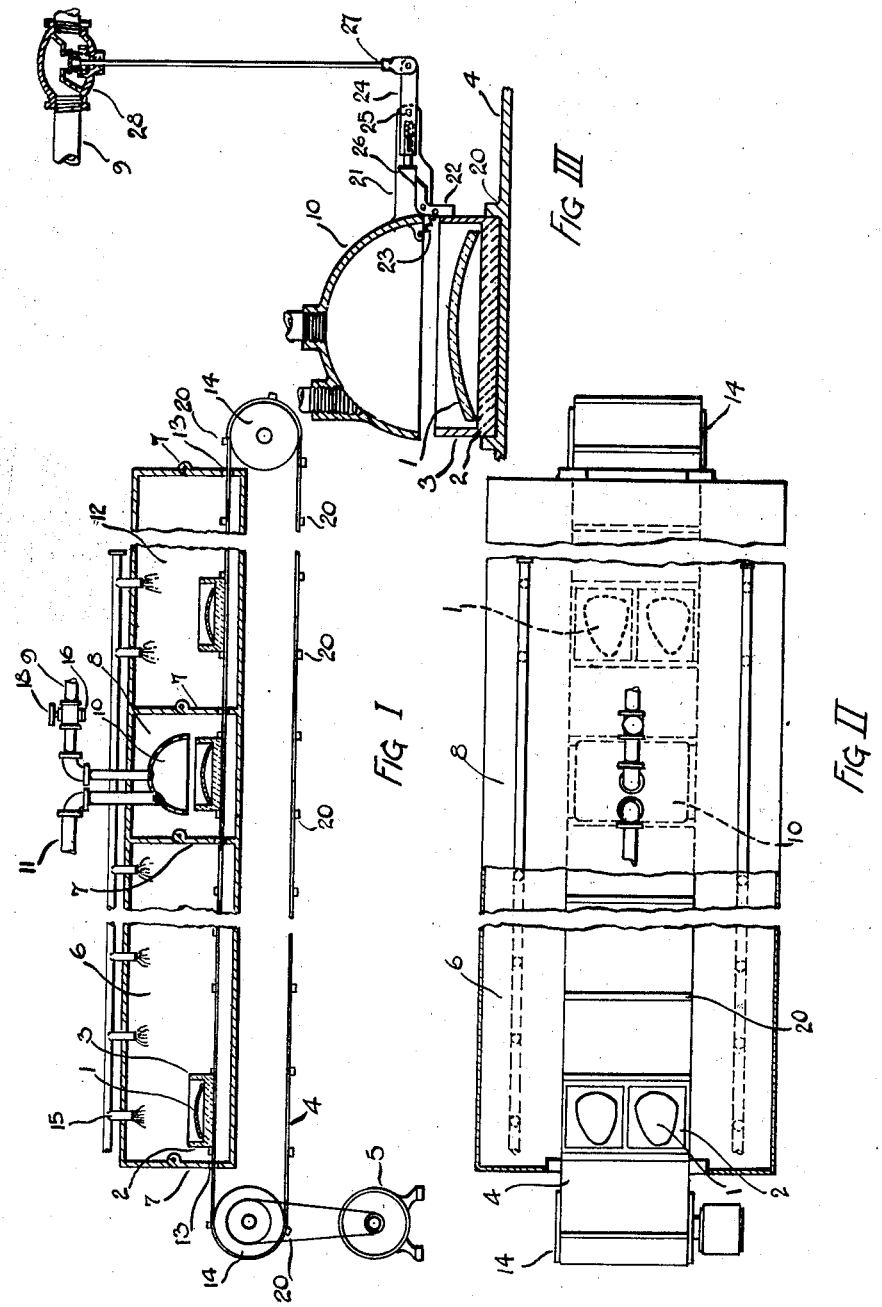

1,809,534

UNITED STATES PATENT OFFICE

EDGAR D. TILLYER, OF SOUTHBRIDGE, AND HAROLD R. MOULTON, OF STURBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

GLASS TREATMENT

Application filed August 1, 1929. Serial No. 382,706.

This invention relates to improvements in glass treatment and has particular reference to a process for producing hardened or strengthened glass and the improved product formed thereby.

The principal object of this invention is to provide means for strengthening glass in such a way that the finished product will be free from the defects usually associated with such strengthened glass.

Another object is to provide means for strengthening finished or polished lenses without injury to the surface.

Another object is to provide means to cool the glass at equal speed throughout the entire area, thus avoiding index changes causing blemishes.

Another object is to provide means whereby the strengthening of glass may be automatically carried out.

Another object is to prevent the breakage and usual wastage of glass associated with the process of hardening the same.

Another object is to provide means whereby various sizes of glass articles may be strengthened without expensive and elaborate changes in equipment.

Other objects and advantages will become apparent from the following description taken in connection with the accompanying drawings, and it will be apparent that many changes may be made in the details of construction, arrangement of parts and steps in the process without departing from the spirit of the invention as expressed in the accompanying claims. We, therefore, do not wish to be limited to the exact details shown and described as the preferred forms only have been shown by way of illustration.

In the drawings:

Fig. I is a front diagrammatic view of the apparatus for carrying out the invention;

Fig. II is a top or plan view of the apparatus shown in Fig. I with the tops of the chambers removed;

Fig. III is a partial section through the cooling chamber, showing a modification.

Hardened or strengthened glass is used for various purposes where an impact hazard is encountered. One of the chief uses is for ophthalmic lenses, particularly those to be used in protection goggles where a hardened lens surface adds greatly to the protective qualities of the goggles. In the past, however, the production of these lenses has been greatly impeded by the fact that a large percentage would be broken in the hardening process which was of a very haphazard nature. The lenses which successfully withstood the hardening process were also not optically uniform and showed in a marked manner the strain to which they had been subjected.

One of the most widely used prior art processes has been to heat the article and then drop it into an oil bath to cool somewhat in the manner that certain steels are hardened. On strong curve lenses in particular this treatment destroyed definition or the quality of the lens by small patches showing through under optical test somewhat like irregular frosting. This was due to irregular cooling in small consecutive areas producing irregular index changes and probably formed by bubbles on the surface when the heated article was thrown in the oil. It will be obvious, therefore, that the articles produced by this method were of poor quality and a great number were rendered quite useless for the purposes to which they were to be put, this being particularly the case in ophthalmic lens manufacture. By and large, the whole process was expensive, detrimental and impractical. In our invention production of hardened glass is now simple, sure and economical.

Referring to the drawings in which similar characters of reference denote corresponding parts throughout the several views, the numeral 1 designates an ophthalmic lens which is to be strengthened. This description of our hardening process will be confined to such an article for the purpose of simplicity, but it will be understood that other glass articles could be strengthened with equal facility with modifications, if necessary, of the apparatus herein described within the scope of the appended claims.

The lens 1 may be first shaped to the size and form it is to bear by the usual prior art methods of molding and grinding as the hardening process may be the final one if desired. No injury to the finished surface will be visible by our improved process of strengthening. If it is of meniscus form, as shown in the drawings, it is preferably placed with the convex side upward on a block 2 or holder of some refractory material. The convex side is specified as this is the surface that is usually subject to the impact hazard. The block 2 is formed to support the lens at the edges to prevent marking when the heat treatment is commenced and has a projection 3 at each end and throughout the center to prevent the lens from falling or being knocked easily from the block.

The block and lens are then placed upon an endless belt 4 driven from a suitable source of power such as motor 5 and running over a pair of pulleys 14. The belt 4 is preferably made from some heat resisting material such as asbestos and has divisions 20 to separate the blocks and help to maintain them in position.

The block 2 bearing the lens 1 is carried by the belt into the first chamber 6 of the series illustrated. This chamber 6 heated by gas or like means 15 is similar to the usual heating furnaces well known to the art and has a swinging door 7 at each end whereby the lens 1 may enter and leave carried by the belt 4. A space 13 is left below the doors 7 for the belt to run between. The heat of the furnace chamber 6 is necessarily varied for different articles, but for the purposes of this description and the lens 1 it may be about 1400 degrees Fahrenheit, or a point where the lens is softened, but not enough to bend, and the lens 1 left in the furnace for two minutes. It will be understood that every change in furnace heat capacity, holder size, heat distribution, lens size, etc., requires change in time or temperature or both.

Having traversed the first chamber 6 and become heated the lens and holder enter the second chamber 8. The particular merit of the invention is now apparent inasmuch as the departure from prior art processes is radical. Instead of the oil treatment used heretofore we subject the heated lens 1 to a cooling blast, such as steam, air or gas, from the inlet pipe 9 which is connected to a suitable supply, not shown. When steam is employed a valve or like means 16 may be used to remove the condensed steam from the pipe line 9, or a steam trap may be incorporated at a convenient point.

The steam or other blast can be admitted by opening the valve 18 in the pipe line 9 and allowing it to travel to the hood 10 and it is exhausted through a vacuum or similar pipe line 11. The steam, if such is used, should contain no water drops and may be superheated or not as conditions make necessary. The chamber 8 is so constructed that the lens 1 is only under the blast for a short time and is then carried on by the belt 4. For the lens being described five seconds would be convenient to follow the temperature before mentioned. The steam or other blast strikes the convex surface of the lens 1 and cools it uniformly over fair sized areas so that the upper surface is hardened or congealed while the inside part is hot. It will be apparent that if the lens were now left to cool the upper surface would be compressed by the next layer of glass contracting more slowly. This would take place throughout the thickness of the lens until the whole lens had reached a uniform temperature. This would avoid the patches of irregular index found in an oil hardened lens, but the lens would be subject to a certain strain if allowed to remain in this state. The pressure or internal stress would be more or less dangerous and quite possibly the lens would fracture and fly apart. We have overcome this objection and provided means to assure positive safety for the hardened lens by a simple process.

Instead of allowing the lens 1 to cool in the open air, we have provided a third chamber 12 which is kept warm. For the lens being described a temperature of 900 degrees Fahrenheit or less would be sufficient. The belt 4 carries the lens 1 into the chamber 12 and through a continuously dropping temperature arranged by heating only the end of the chamber nearest the blast. After about sixty minutes travelling through the cooling chamber 12 the lens reaches a temperature similar to the outside air and emerges through the last door 7 in a state where it can be handled with ease. The length of the chambers may be fixed both in relation to each other and in relation to the speed of the belt 4 and the temperatures used so that many different sizes of lenses and other articles may be treated with great facility. The number of lenses shown in the drawings has been confined to a single pair in each chamber, but any number may be placed upon the belt in consecutive positions as conditions warrant.

In Fig. III, we have shown a modification of the device for allowing the blast to strike the face of the lens. In Fig. III an automatic device is shown which is operated by the motion of the blocks 2. The hood 10 has an extension 21 carrying a bell crank 22 which is pivoted thereon. A spring 23 is fixed to the crank 22 and serves to hold it in the position desired, which is as shown in Fig. III. A lever 24 is pivoted at 25 at the other end of the extension 21 and has a spring plunger 26 free to move in and out at one end. The faces of the plunger 26 and crank 22 are at an angle for quick release. A connecting rod 27 is pivoted at the other end of the lever 24 and extends into the usual type of steam valve 28 carried by the pipe line 9.

The action of the block 2 is to push the crank 22 up, and this in turn moves the lever 24 which operates the rod 27 to release the valve. As soon as this happens the crank 22 has slipped past the sloping face of the plunger 26 and the valve closes. The spring 23 returns the crank 22 to its first position as soon as the block has passed.

It will be seen that the blast is only directed onto the article for a short period as the valve will close as soon as the lever 24 drops. This, of course, can be adjusted to suit the requirements of the article being strengthened. The operation of the apparatus will be clear from the foregoing description. The finished article will be free from the blemishes associated with prior art methods as oil bubbles are completely eliminated and also the irregular cooling which is inevitable with the oil process. The possibility of breakage has also been eliminated by the annealing process. It is clear that the process is a great advance in the art and that all the objects and advantages of the invention have been accomplished.

From the foregoing it will be seen that we have provided simple and economical means of accomplishing the novel process and manufacturing the improved article described. It will be understood, however, that the apparatus described may be modified in any manner within the scope of the appended claims.

Having described our invention, we claim:

1. The process of strengthening glass comprising supporting a glass article by its edges on a block, placing the block on a moving belt and passing the block on the belt through a series of heating and cooling chambers.

2. The process of strengthening glass comprising supporting a glass article by its edges on a block, placing the block on a moving belt, passing the block on the belt through a heating chamber, subjecting the heated article to a cooling blast to strengthen it, and passing the strengthened article through a warm chamber to gradually bring it to room temperature without fracture.

3. In a device of the character described, a block, a lens mounted on the block, a moving belt to carry the lens and block, a chamber to heat the lens when carried therethrough by the moving belt, a cooling blast adjacent the heating chamber under which the lens is carried by the moving belt to strengthen it, and a cooling chamber adjacent the blast adapted to receive the strengthened lens and slowly reduce it to its original temperature.

4. In a device for strengthening ophthalmic lenses, a moving belt carrying the lenses, a heating chamber traversed by the belt and lenses, a cooling blast adjacent the heating chamber to strengthen the lenses passed thereunder, and means adjoining said blast to receive the strengthened lenses and slowly reduce them to their original temperature.

5. The process of strengthening glass comprising placing the glass on a refractory block, placing the glass and block on a movable conveyor, moving same on the conveyor into a heat chamber and subjecting the same to heat, moving same into another chamber and subjecting it to a cooling blast to strengthen the glass, moving same into an annealing chamber and slowly reducing its temperature to ordinary atmospheric temperature.

6. The process of strengthening glass comprising placing the glass on a refractory block on a moving conveyor and passing the same progressively on the moving conveyor through a heating chamber, a cool blast chamber and an annealing chamber where its temperature is allowed to slowly fall to atmospheric temperature.

7. The process of strengthening glass comprising placing the glass on a refractory block on a continuously moving conveyor and passing the same successively through a heating chamber, a cooling blast chamber and an annealing chamber.

EDGAR D. TILLYER.
HAROLD R. MOULTON.